(12) United States Patent
Wahlberg et al.

(10) Patent No.: US 9,993,788 B2
(45) Date of Patent: Jun. 12, 2018

(54) BIOMASS TREATMENT SYSTEM

(71) Applicant: Valmet AB, Sundsvall (SE)

(72) Inventors: Robert Wahlberg, Sundsvall (SE); Jan Detlefsen, Alnö (SE); Patrik Pettersson, Alnö (SE); Ulf Eriksson, Sundsvall (SE)

(73) Assignee: Valmet AB (SE)

( * ) Notice: Subject to any disclaimer, the term of this patent is extended or adjusted under 35 U.S.C. 154(b) by 5 days.

(21) Appl. No.: 15/316,965

(22) PCT Filed: Jun. 16, 2015

(86) PCT No.: PCT/SE2015/050703
§ 371 (c)(1),
(2) Date: Dec. 7, 2016

(87) PCT Pub. No.: WO2015/199601
PCT Pub. Date: Dec. 30, 2015

(65) Prior Publication Data
US 2017/0113198 A1 Apr. 27, 2017

(30) Foreign Application Priority Data
Jun. 24, 2014 (SE) ..................... 1450778

(51) Int. Cl.
*B01J 3/00* (2006.01)
*B01J 3/02* (2006.01)
(Continued)

(52) U.S. Cl.
CPC . *B01J 3/02* (2013.01); *B01J 3/03* (2013.01); *D21C 7/08* (2013.01); *F16K 3/085* (2013.01);
(Continued)

(58) Field of Classification Search
CPC ......... B01J 3/00; B01J 3/02; B01J 3/03; B01J 19/00; B01J 19/18; B01J 19/24;
(Continued)

(56) References Cited

U.S. PATENT DOCUMENTS 2,803,540 A 8/1957 Durant et al.
2,931,393 A 4/1960 Jones
(Continued)

FOREIGN PATENT DOCUMENTS

DE 1160290 B 12/1963
DE 1601272 A1 12/1970
(Continued)

OTHER PUBLICATIONS

International Search Report for PCT/SE2015/050703 dated Sep. 25, 2015.
(Continued)

*Primary Examiner* — Natasha E Young
(74) *Attorney, Agent, or Firm* — Lerner, David, Littenberg, Krumholz & Mentlik, LLP

(57) ABSTRACT

In an outlet flow control arrangement (1) arrangeable to control a flow of material through an outlet (2) with a predetermined diameter arranged at an end of a pressurized processing container (3), the outlet flow control arrangement (1) comprises an adaptor unit (4) configured so that a cross-section of a flow into the adaptor unit (4) is reduced as compared to a cross-section of the outlet (2), to enable the adaptor unit (4) to control and center a flow of processed material out of the processing container (3) and through the outlet (2) into a discharge pipe (5).

8 Claims, 8 Drawing Sheets

(51) Int. Cl.
*B01J 3/03* (2006.01)
*B01J 19/00* (2006.01)
*B01J 19/18* (2006.01)
*D21C 7/00* (2006.01)
*D21C 7/08* (2006.01)
*F16K 3/08* (2006.01)
*F16K 3/00* (2006.01)
*F16K 3/02* (2006.01)
*F16K 3/04* (2006.01)
*F16K 3/06* (2006.01)

(52) U.S. Cl.
CPC .................. *B01J 2219/00024* (2013.01); *B01J 2219/00164* (2013.01); *B01J 2219/00245* (2013.01); *B01J 2219/00252* (2013.01)

(58) Field of Classification Search
CPC .......... B01J 2219/00; B01J 2219/00002; B01J 2219/00018; B01J 2219/00024; B01J 2219/00049; B01J 2219/00164; B01J 2219/00245; B01J 2219/00252; D21C 7/00; D21C 7/08; F16K 3/00; F16K 3/02; F16K 3/04–3/085
See application file for complete search history.

(56) References Cited

U.S. PATENT DOCUMENTS

| | | |
|---|---|---|
| 3,579,421 A | 5/1971 | Richter |
| 5,308,040 A | 5/1994 | Torres |
| 7,314,538 B2 * | 1/2008 | Lashofer .................. D21C 7/08 162/27 |
| 2014/0110069 A1 | 4/2014 | Rawls et al. |

FOREIGN PATENT DOCUMENTS

| | | |
|---|---|---|
| FR | 1182975 A | 7/1959 |
| GB | 267759 A | 3/1927 |

OTHER PUBLICATIONS

International Preliminary Report on Patentability for PCT/SE2015/050703 dated Oct. 17, 2016 and Article 34 Amendment dated Oct. 10, 2016.
Written Opinion for PCT/SE2015/050703 dated Sep. 25, 2015.

* cited by examiner

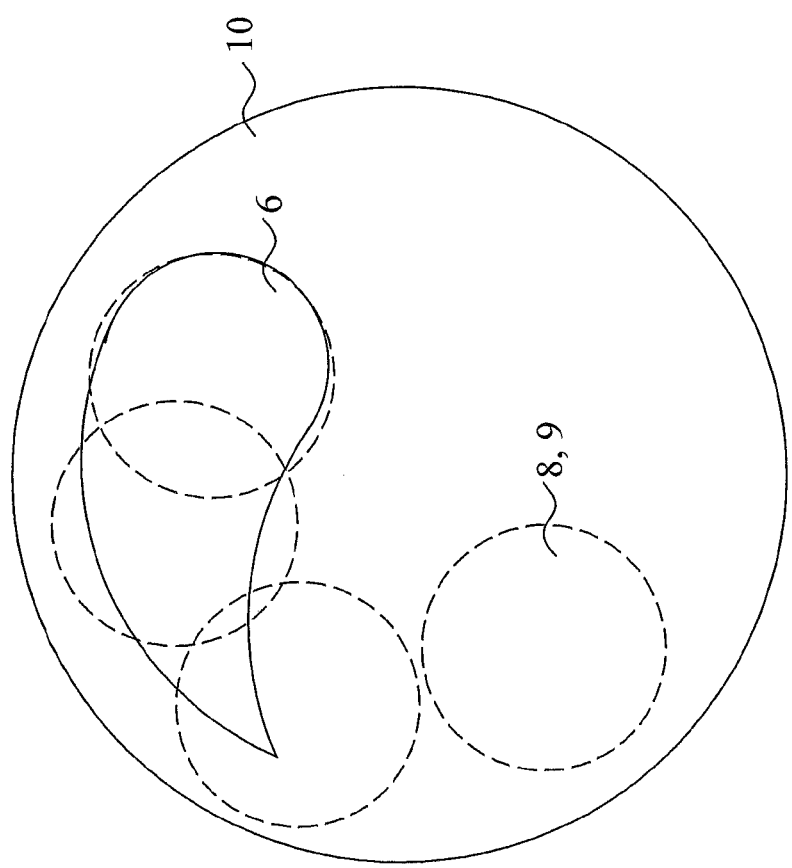

BIOMASS TREATMENT SYSTEM

CROSS-REFERENCE TO RELATED PATENT APPLICATIONS

The present application is a national phase entry under 35 U.S.C. § 371 of International Application No. PCT/SE2015/050703, now WO 2015/199601, filed Jun. 16, 2015, published in English, which claims priority from Swedish Application No. 1450778-4, filed Jun. 24, 2014, all of which are incorporated herein by reference.

TECHNICAL FIELD

The present invention relates to evacuation of material from pressurized processing chambers in general, and particularly to arrangements for controlling outlet flow of material during such evacuation.

BACKGROUND

In current day processing equipment handling hot and abrasive material, such as biomass boiler and feeder systems, wear of valves and pipes in the system is a common problem. In particular, problems of wear as well as plugging is common when hot (or cold) blowing material out of a pressurized processing container for further transportation in a pipe system. This causes severe costs and contributes to time loss due to maintenance, repair and replacement of wear parts such as valves and couplings. In the following description the terminology hot and cold blowing will be used. For cold blowing the material to be processed has been cooled down below 100° C. by adding water e.g. the concentration is low and thereby the material leaving the outlet is less abrasive. Hot blow or steam explosion implies that the material is both warmer and less diluted, thus causing a more abrasive wear on the processing equipment.

One known valve utilized in such systems is a so called gate-valve, in which flow is controlled by lowering or raising a gate like valve. When processing non-homogeneous material in which there is a size distribution of the particles in the material, a gate valve is very likely to trap larger particles of the material due to plugging whilst smaller particles manage to escape through the remaining opening "beneath" the gate.

Another know valve utilized in such systems is a so called ball valve, in which flow is controlled by rotating a ball with a central perforation. During such a rotation the flow of material is no longer centralized in the pipe in which the valve is located, but rather sprays across the pipe during closing or opening of the valve. When handling abrasive and optionally hot material this might cause severe wear and possible puncture of nearby walls of the pipe.

Therefore, there is a need for control of the outlet flow which overcomes the above described disadvantages.

SUMMARY

The present invention relates to evacuation of processed material out of a pressurized processing container.

According to a first aspect, the present disclosure presents an outlet flow control arrangement arrangeable to control a flow of material through an outlet with a predetermined diameter arranged at an end of a pressurized processing container. The outlet flow control arrangement includes an adaptor unit arranged to control and center a flow of processed material out of the processing container and through the outlet into a discharge pipe.

One advantage of the current disclosure is a reduced wear and reduced risk of plugging in hot blow systems during evacuation of hot abrasive material out of a pressurized container.

BRIEF DESCRIPTION OF THE DRAWINGS

The invention, together with further objects and advantages thereof, may best be understood by making reference to the following description taken together with the accompanying drawings, in which:

FIG. 8 is a different view of the embodiment of FIG. 7;

DETAILED DESCRIPTION

The present disclosure concerns blowing in general, and particularly methods and arrangements for reducing wear and plugging during hot or cold blowing of abrasive material out of a pressurized processing chamber.

Although described as implemented in a hot blowing system, the teachings of the current disclosure are equally applicable to other systems (hot or cold) in which abrasive material is evacuated from a pressurized container into a pipe, open air or into another container. As the abrasiveness of a material depends on both the material itself as well as the surrounding environment, the term abrasive is used to describe the processing of a material in which process the material can be regarded as abrasive. As an example, at a low temperature a material might not be viewed as being abrasive whereas at a higher temperature the abrasive wear of the material is clearly increased.

A general system in which the present disclosure can be beneficially implemented will be described. This system includes a pressurized process chamber or container into which material is introduced at one end and subjected to e.g. boiling, steaming or other hot or cold process. The material is transported within the processing chamber and evacuated at an outlet in another end of the chamber. The evacuated material is then transported through a systems of pipes to subsequent processing arrangements. The teachings of the current disclosure are beneficially implemented at the outlet of the pressurized processing chamber. Examples of such a pressurized processing container could be a boiler, steamer, refiner for pulp, impregnator, vertical or horizontal reactors etc.

Figure 1:
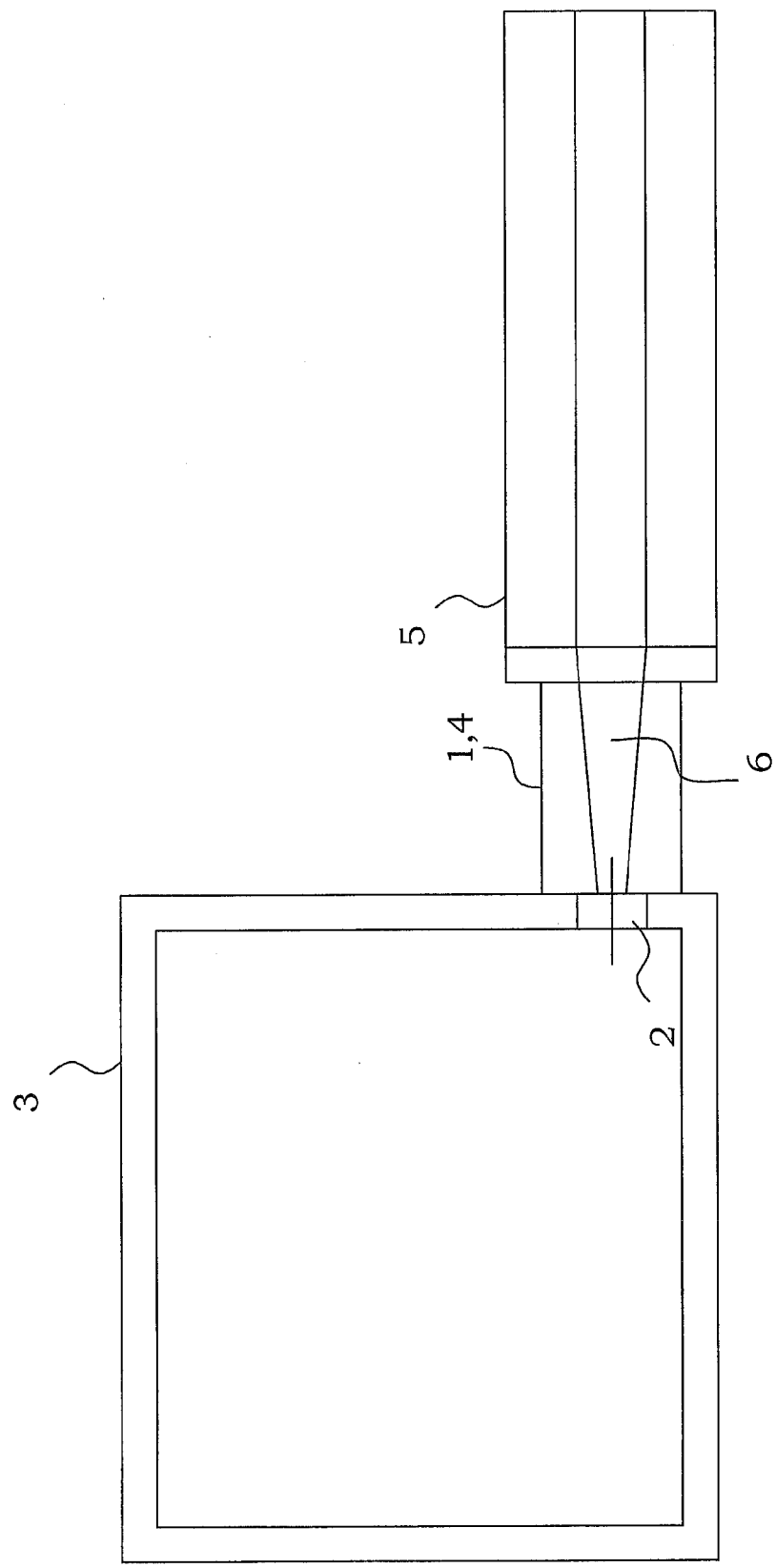
FIG. 1 is an embodiment of an arrangement according to the present disclosure.

The inventors have identified that in order to reduce the wear in subsequent pipes after exiting the outlet it is beneficial to ensure that the flow of material out of the chamber is centered in the outlet or at least into a blow pipe connecting the outlet with the subsequent system. This is particularly necessary in systems processing biomass from e.g. straw, bagasse or other plants that cause wear in the blow-valve and the blow-line. With reference to FIG. 1, a general embodiment of an outlet flow arrangement 1 according to the present disclosure will be described. The system in which the embodiment is described is illustrated in a general manner. The arrangement 1 is arrangeable to control a flow of material through an outlet 2 with a predetermined diameter or cross section arranged at an end of a pressurized processing container 3. The outlet flow control arrangement 1 further comprises an adaptor unit 4 arranged to control and center a flow of processed material out of the processing container 3 and through the outlet 2 into a discharge or blow pipe 5. This is enabled by configuring the adaptor unit 4 such that a cross section of the flow into the adaptor unit 4 is reduced compared to the cross section of the outlet 2 and particularly the inner diameter of the blow pipe 5. In this manner the flow into the blow pipe is centered, and due to the difference in cross section, there will be a steam explosion as the centralized flow expands into the blow pipe 5.

According to a basic embodiment, the adaptor unit 4 comprises a cylindrical body with a central cylindrical bore 6, and a flange arranged at an end of said cylindrical body. In the arrangement in FIG. 1, the adaptor unit 4 is arranged at an outer rim of the outlet and outside the pressurized container itself.

In order to further promote the centralization of the flow, also with reference to FIG. 1, the cylindrical bore 6 of the adaptor unit 4 is tapered from a first end 61 of the adaptor unit 4 arranged at the outlet and with an increased diameter towards a second end 62 of the adaptor unit 4 arranged at the discharge pipe 3. In other words, the cylindrical bore 6 has a smaller diameter adjacent to the outlet and a larger diameter adjacent to the discharge pipe 3. According to a further embodiment the diameter of the bore in the first end is smaller than a diameter of the outlet 2, and wherein a diameter of the bore in the second end corresponds to an internal diameter of the discharge pipe or blow pipe 3.

In the above, the cylindrical bore 6 has been described as having a continuous width from one end of the adaptor unit 4 to the other, or have a conical shape in which the diameter in the first end 61 is smaller than the diameter in the second end 62 of the adaptor unit 4. It is also possible to have a bore 6 that has a trumpet shape in which the diameter does not increase linearly from one end 61 to the other 62, or some other non-linear shape. In addition, both the length of the adaptor 4 and consequently the cylindrical bore 6 can be varied based on both the size of the outlet 2 as well as the internal diameter of the discharge pipe 5.

Figure 6:
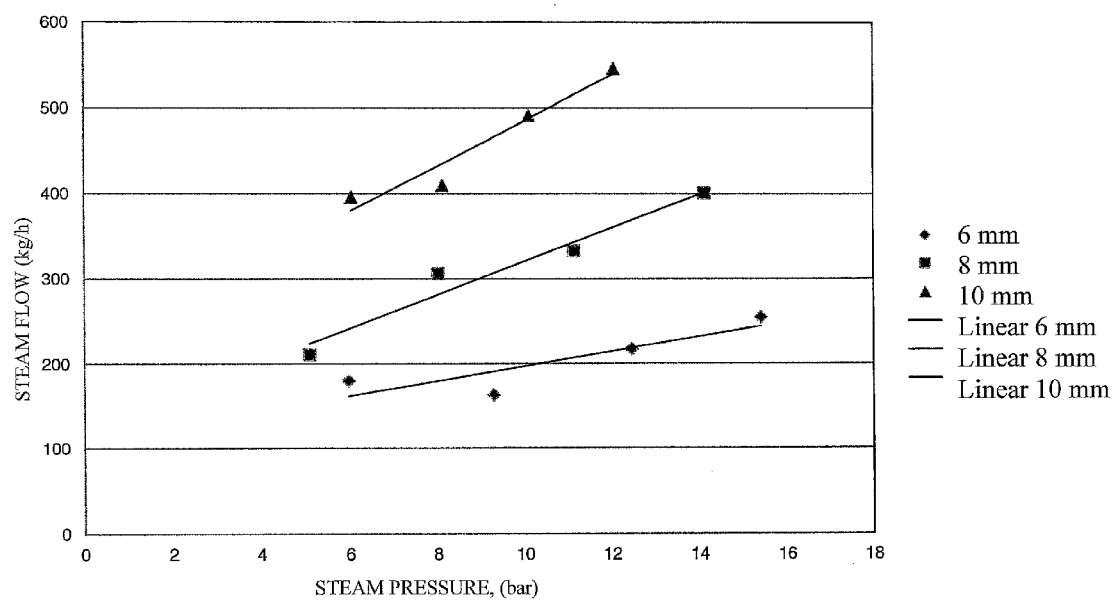
FIG. 6 is a graph illustration the benefits of the embodiment of FIG. 1 of the present disclosure.

By having a reduced diameter in the first end 61 of the cylindrical bore 6 as compared to the diameter of the outlet 2 a reduction of the outbound flow is enabled. In FIG. 6 an example of the potential reduction in steam consumption when using different reductions in the size of the cylindrical bore 6 in the adaptor unit 4 for a number of operating pressures of the processing chamber. Accordingly, the graph illustrates the relation between steam flow and steam pressure for three different reductions in the cylindrical bore 6. The solid lines illustrate the linear nature of the relationship for each reduction. It is evident that by increasing a reduction e.g. moving from a reduction of 6 mm to a reduction of 10 mm it is possible to maintain a same steam pressure but enable an increase in the steam flow. In this context the term reduction is used to denominate the size of the first end 61 of the adapter 4 as compared to the diameter of the discharge pipe or blow pipe 5, in the particular example of FIG. 6 the inner diameter of the discharge pipe is 27 mm. Thereby, the numbers 6/8/10 mm correspond to the diameter of the bore in the first end 61 of the adapter resulting in a 78%/70%/63% reduction from the inner diameter of the blow pipe 5.

In order to further explore the potential benefits of enabling varying the size of the reduction as illustrated in FIG. 6, a further embodiment of an outlet flow control arrangement 1 will be described with reference to FIG. 2. As understood from the previous discussion, by varying the size of the reduction of the bore 6 it is possible to adapt the steam flow or steam pressure out of the processing chamber 3.

In the above described embodiments, the adaptor unit 4 is located outside the pressurized processing chamber. However, in order to enable an adaptation of the size of the bore 6 in the adaptor unit 4, it is also possible to arrange the adaptor unit 4 within the pressurized processing chamber as is illustrated in FIG. 2.

According to this embodiment, the adaptor unit 4 comprises a rotatable disc 4 arrangeable within the pressurized processing chamber 3, the disc comprises at least one bore 6 that is arranged to align with the outlet 2 when the circular disc 4 is rotated around its central axis. The disc is arranged at the same end of the pressurized processing chamber 3 as the outlet 2, such that the at least one bore 6 of the disc can align with the outlet 2. Additionally, the arrangement 1 also includes a control or drive unit 8 for controlling the rotation and orientation of the disc 4 relative the outlet 2.

According to a further embodiment, the disc 4 can comprise a plurality of bores 6 with a same or varying size. Thereby, by having same size bores 6, it is possible to rotate the disc to provide a fresh bore 6 if a previous bore 6 is worn or plugged. By having bores 6 with a varying size it is possible to vary the size of the outgoing flow of material through the outlet 2 by rotating the disc 1, 4 until another bore 6 aligns with the outlet 2. This is especially beneficial when changing material to be processed in the chamber thus rendering the system more versatile and reducing the time it takes to adapt the system from one material to another. The change or switch from one bore 6 to another can be effectuated without dismantling the arrangement. Instead a simple rotation of the disc to align a different bore 6 with the outlet is performed. Another reason for changing to another sized bore 6 is to maintain a constant flow of steam out of the chamber when a processing pressure is changed or varied within the processing chamber The disc 4 can, according to a particular embodiment, be connected to an external control unit or drive comprising an external engine 8 arranged outside the processing chamber and connected to the disc 4 via a drive axis 7 or similar arrangement. The engine 8 can be arranged to control the rotation of the disc to progress stepwise in order to ensure alignment of a selected bore 6 with the outlet 2 or continuous to enable rotation of the disc to move the bore 6 relative the outlet 2 whilst maintaining the bore in relative alignment with the outlet 2.

According to a further embodiment, in a corresponding manner as the first embodiment with the externally arranged adaptor unit 1, 4 at least one bore 6 in the disc is configured to provide a smaller exit bore 6 than the outlet 2 of the processing chamber 3. Additionally, at least one bore 6 may be tapered through the disc, such that an opening on a first side 61 of the disc 4 is smaller than the outlet 2 and an opening on a second side 62 of the disc is equal to the outlet 2.

Figure 3:
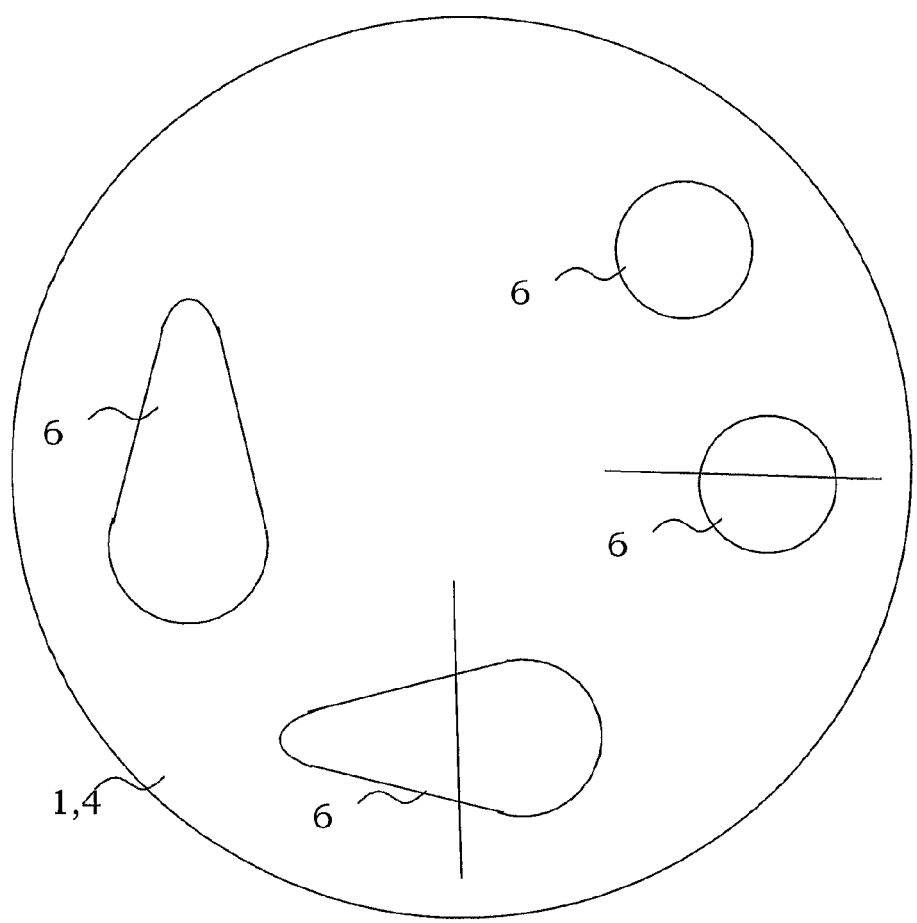
FIG. 3 is an illustration of part of the embodiment of FIG. 2.
Figure 3:
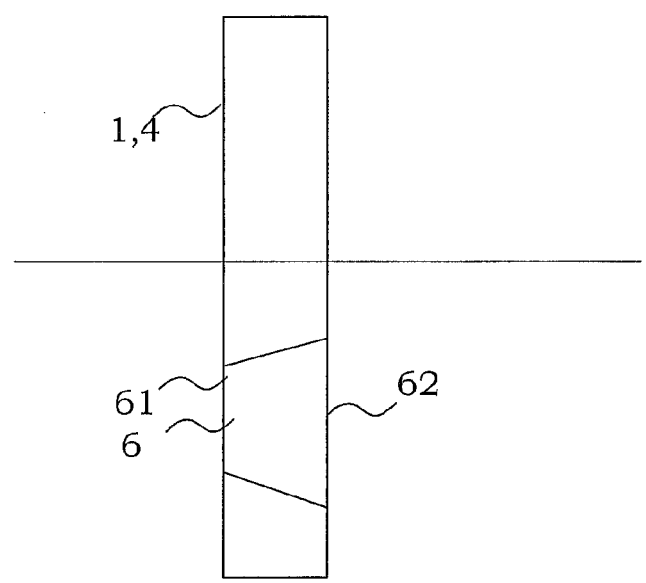

In the above described embodiments, the at least one bore 6 has been described as being circular. However, although it might intuitively be thought that a circular bore 6 would be most beneficial, also a non-circular bore 6 has its benefits as is illustrated in FIG. 3. In this embodiment it is also illustrated that the disc may comprise bores 6 with differing shapes e.g. bores being circular, non-circular, elongated, elliptical etc. as well as different sizes.

One example of a non-circular bore 6 can be described as having a drop shape in which the bore 6 is elongated and tapered perpendicular to a radius of the disc. According to a particular example the bore 6 is tapered and has a large radius in one end and a small radius at the other end. One direct consequence of this shape is that it enables adapting the flow of processed material through said outlet 2 by rotation of the disc without cutting the flow in the process. Instead of, as is the case of moving from one bore 6 to another, completely cutting the flow when adapting the size of the outlet arrangement, the non-circular bore 6 enables continuously adapting the flow within the same bore 6 by rotating the disc such that the flow is concentrated at one or the other end of the bore 6. This could be advantageous both if the material properties change and if one end e.g. the larger radius is worn. By rotating the disc and moving the flow of the material through a more narrow section of the bore 6 the flow can be adapted.

By utilizing tapered bores 6 in the disc, the flow out of the bore 6 is centered and by using bores 6 that are tapered in a direction of the surface of the disc, e.g. perpendicular to the flow of the evacuated material it is possible to control the flow of the material. By adjusting the placement of the tapered bore 6 relative the outlet 2 it is possible to increase or decrease the flow out of the chamber 3 and thereby control the speed and pressure of the material flow. In addition, the bores 6 may be tapered in the direction of the thickness of the disc 4, in the same manner as the adaptor unit 4 with its cylindrical, tapered bore 6.

Figure 4:
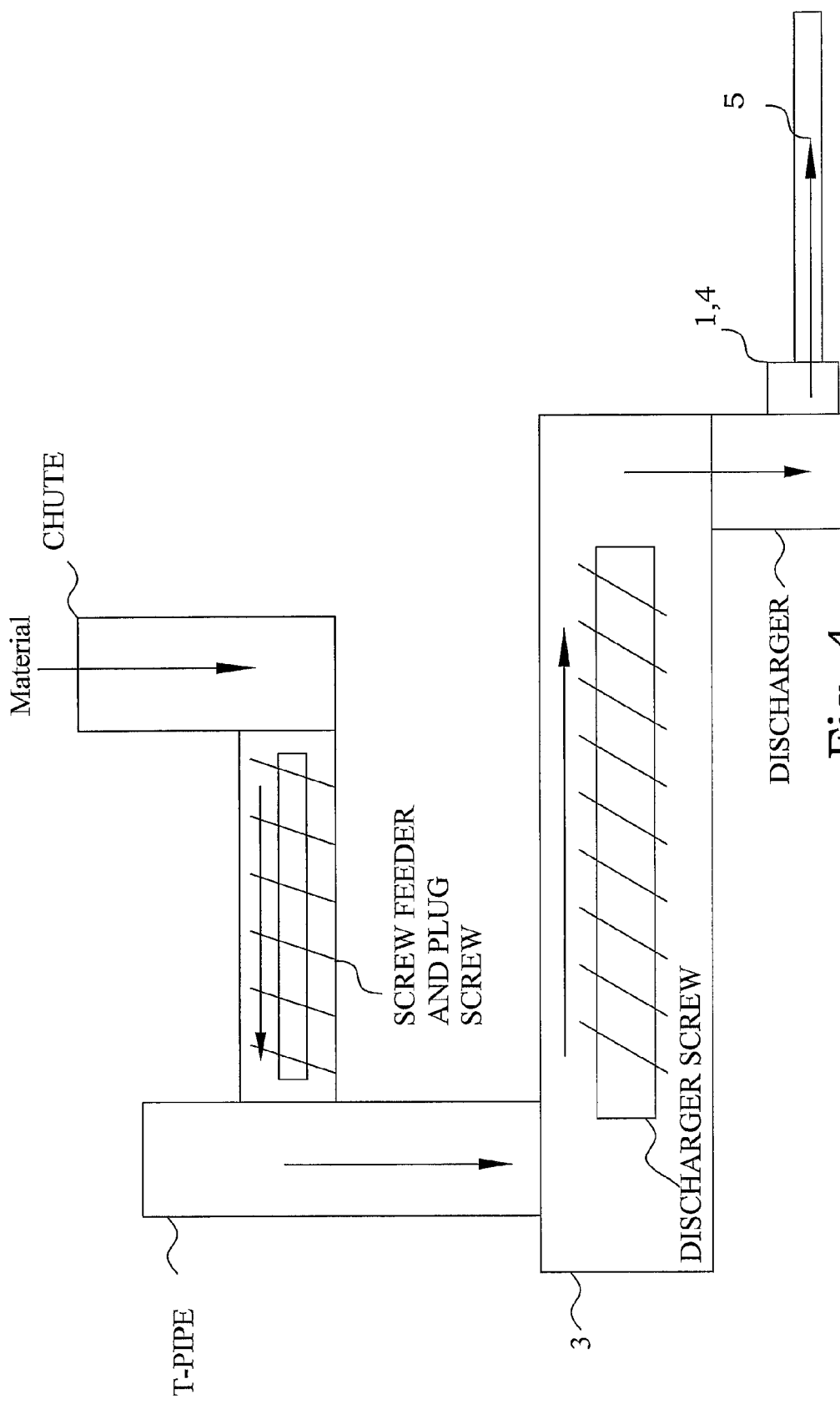
FIG. 4 is an illustration of an embodiment of a biomass processing system of the present disclosure.

With reference to FIG. 4, an embodiment of a particular system in which the current disclosure can be implemented is illustrated. The system is a biomass treatment system comprising an outlet flow control arrangement according to any of the above described embodiments. The system includes a pressurized processing container is a reactor or biomass boiler and the biomass treatment system further comprises a plug screw arranged within the biomass boiler and the plug screw is configured for feeding biomass from one end of the reactor towards the outlet flow control arrangement. The system further is connectable to a chute for receiving material to be processed. The chute is connectable to a pin drum feeder or the like for feeding the received material, which feeds the material to a screw feeder and subsequently a plug screw. The plug screw transports the material to a t-pipe which introduces the material into the pressurized processing chamber i.e. reactor. In the reactor the material is subjected to steam at high pressure, and simultaneously fed towards a discharger, by means of a discharger screw or similar device, in which the outlet control arrangement of the current technology is arranged.

Figure 5:
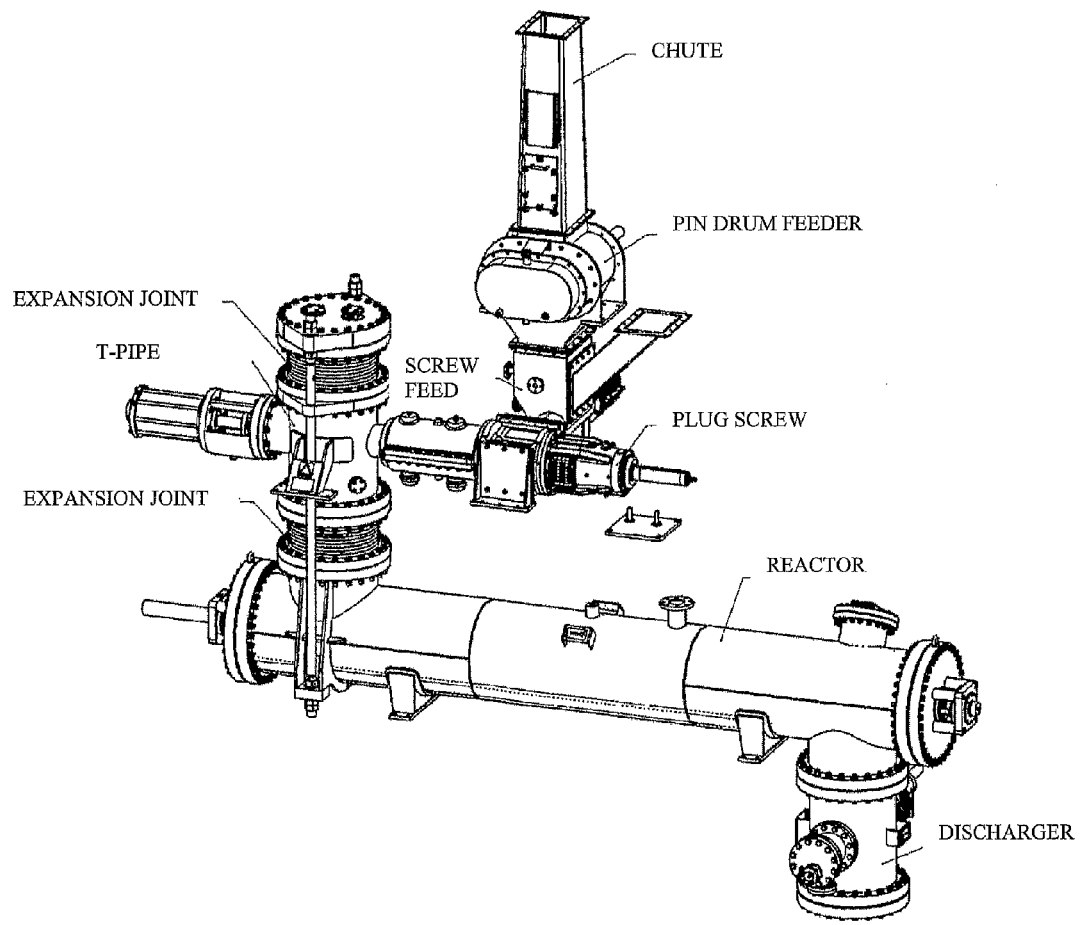
FIG. 5 is an illustration of an embodiment of a biomass processing system of the present disclosure.

A detailed picture of an implementation of a biomass processing system as described in FIG. 4 is illustrated in FIG. 5.

Figure 7:
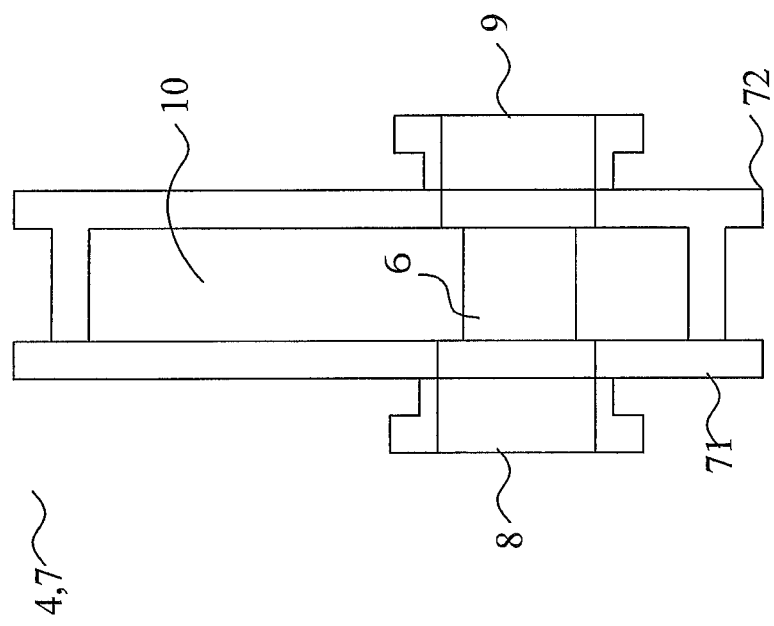
FIG. 7 is a further embodiment of an arrangement according to the present disclosure.

With reference to FIG. 7, a particular embodiment of a blow valve utilizable as the above described adaptor 4 will be described.

Figure 2:
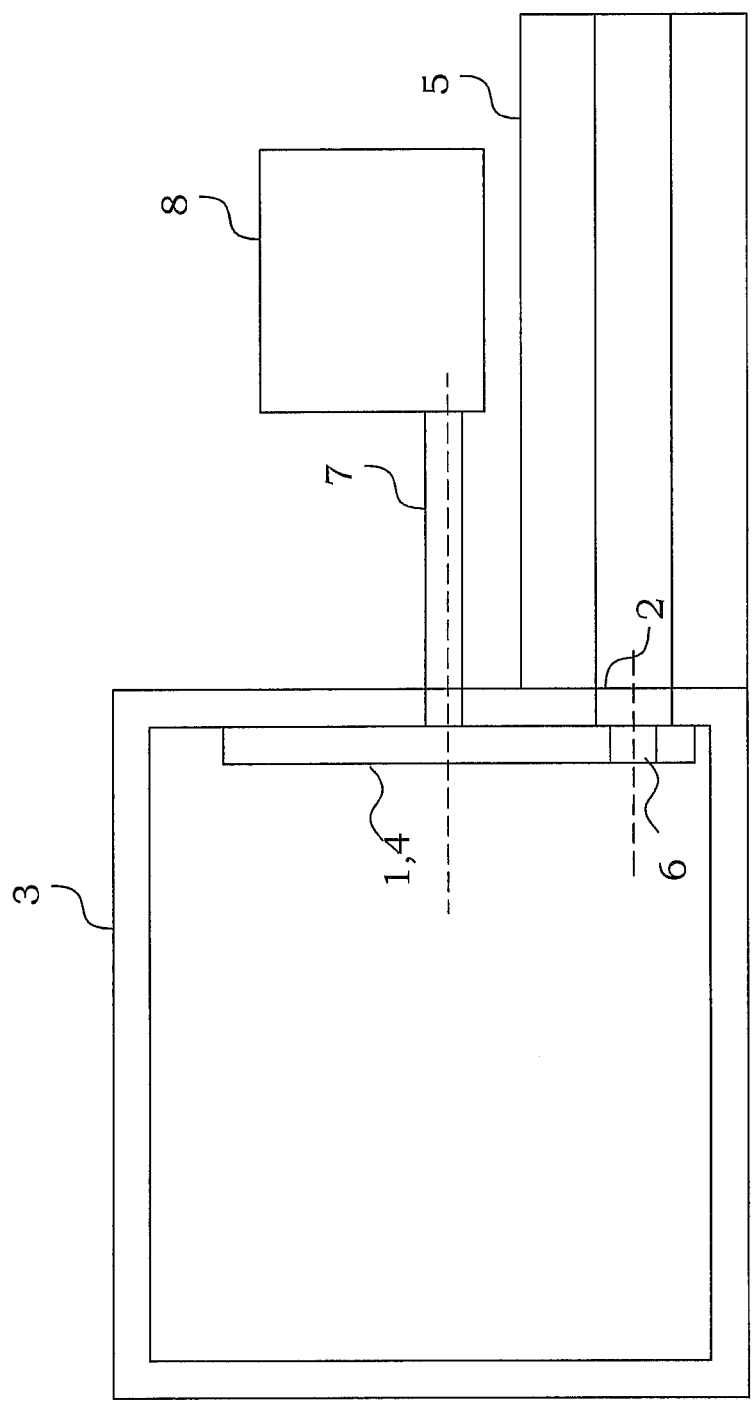
FIG. 2 is another embodiment of an arrangement according to the present disclosure.

In this embodiment, which can be seen as a variation of the embodiment of FIG. 2 with the rotatable disc, the adaptor 4 is construed as a separate blow valve 4 adapted to be inserted between the outlet 2 and the blow pipe 5. In particular the blow valve 4 comprises a housing 7 with an inlet 8 connectable to the outlet 2 and an outlet 9 connectable to the blow pipe 5. Within the housing 7, a perforated rotatable disc 10 is arranged. The disc 10 corresponds to the disc 4 of the embodiment in FIG. 2. Consequently, the disc 10 is configured to be rotated within the housing 7 in order to align a bore 6 or part of a bore 6 in the disc 10 with the inlet 8 and the outlet 9. As mentioned with reference to FIG. 2 and FIG. 3 a bore 6 in the disc 10 can be a circular, elliptical, drop shaped or otherwise shaped bore. In a particular arrangement the housing 7 consists of two plates 71, 72 between which the rotatable disc 10 is sandwiched and in which plates 71, 72 the respective inlet 7 and outlet 8 are arranged. In other words, the plates 71, 72 are arranged such that the rotatable disc 10 is enclosed and in sliding contact with each plate 71, 72, whereby any material transported thorough the bore 6 of the disc 10 does not leak into any space between the plates 71, 72 and the disc 10.

The disc 10 can be configured to be rotated by means of an externally arranged drive shaft and engine, or by a manually manipulated handle or lever. This is illustrated schematically in FIG. 8, in which a disc 10 with a non-circular bore 6 is illustrated in three different states of rotation. The orientation of the opening of the inlet 8 and outlet 9 of the blow valve 4, relative the bore 6 of the disc 10, is indicated by the dotted circle overlaying the bore 6 of the disc 10. Due to the non-circular nature of the bore 6, the opening in the channel formed by the inlet 8 and the outlet 9 of the blow valve 4 varies in shape during the rotation of the disc 10. Although shown with a rotatable disc 10, it could be implemented as a static disc 10 enclosed in a rotatable housing 7, the main aspect being that there is a relative rotational motion between the housing 7 and the disc 10 to align different parts of bores 6 or different bores 6 with the inlet 8 and outlet 9 of the blow valve 4. In the FIG. 8 four different orientations of the embodiments is shown, where the channel formed by the inlet 8, the bore 6 and the outlet 9 varies from being fully closed to fully open.

Although the current disclosures mainly deals with hot-blowing when evacuating material from a pressurized container into a blow pipe, the teachings can be implemented in a system where material is evacuated between interfaces zones having different pressure, in other words when material is evacuated from a first part of a container with a first predetermined pressure into a second part of a container with a second predetermined pressure. Additionally, the teachings of the current disclosure is equally applicable to a cold blowing system.

Biomass is used to include materials such as wood, bagasse, grass, fruit peel, leaves, bark, etc.

The embodiments of the current disclosure enable a reduced steam consumption whilst maintaining a same material flow. Additionally, the current disclosure enables avoiding frequent plugging in the out feed from e.g. refiners, boilers and the like.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A biomass treatment system comprising a pressurized processing container being a reactor, a discharger screw arranged within said reactor and an outlet flow control arrangement arranged to control a flow of material through an outlet with a predetermined diameter arranged at an end of a pressurized processing container, said discharger screw being configured for feeding biomass from one end of said pressurized processing container towards said outlet flow control arrangement, wherein said outlet flow control arrangement comprises an adaptor unit arranged to control and center a flow of processed material out of said processing container and through said outlet into said discharge pipe, wherein said adaptor unit comprises a rotatable disc arrangeable within said pressurized processing chamber, said disc comprises at least one bore arranged to align with said outlet when said circular disc is rotated around its central axis, wherein said at least one bore is configured to provide a smaller exit bore than said outlet of said processing chamber.

2. The biomass treatment system according to claim 1, wherein said at least one bore is tapered through said disc, such that an opening on a first side of said disc is smaller than said outlet and an opening on a second side of said disc is equal to said outlet.

3. The biomass treatment system according to claim 2, wherein said at least one bore of said circular disc comprises circular bores.

4. The biomass treatment system according to claim 2, wherein said at least one bore of said circular disc comprise non-circular bores.

5. The biomass treatment system according to claim 4, wherein said at least one bore is elongated and tapered perpendicular to a radius of said disc, thereby enabling adapting the flow of processed material through said outlet by rotation of said disc.

6. The biomass treatment system according to claim 1, wherein said at least one bore of said circular disc comprises circular bores.

7. The biomass treatment system according to claim 1, wherein said at least one bore of said circular disc comprise non-circular bores.

8. The biomass treatment system according to claim 7, wherein said at least one bore is elongated and tapered perpendicular to a radius of said disc, thereby enabling adapting the flow of processed material through said outlet by rotation of said disc.

* * * * *